Oct. 12, 1937.   A. E. W. JOHNSON   2,095,874
ROD WEEDER DRIVE
Filed Dec. 24, 1936
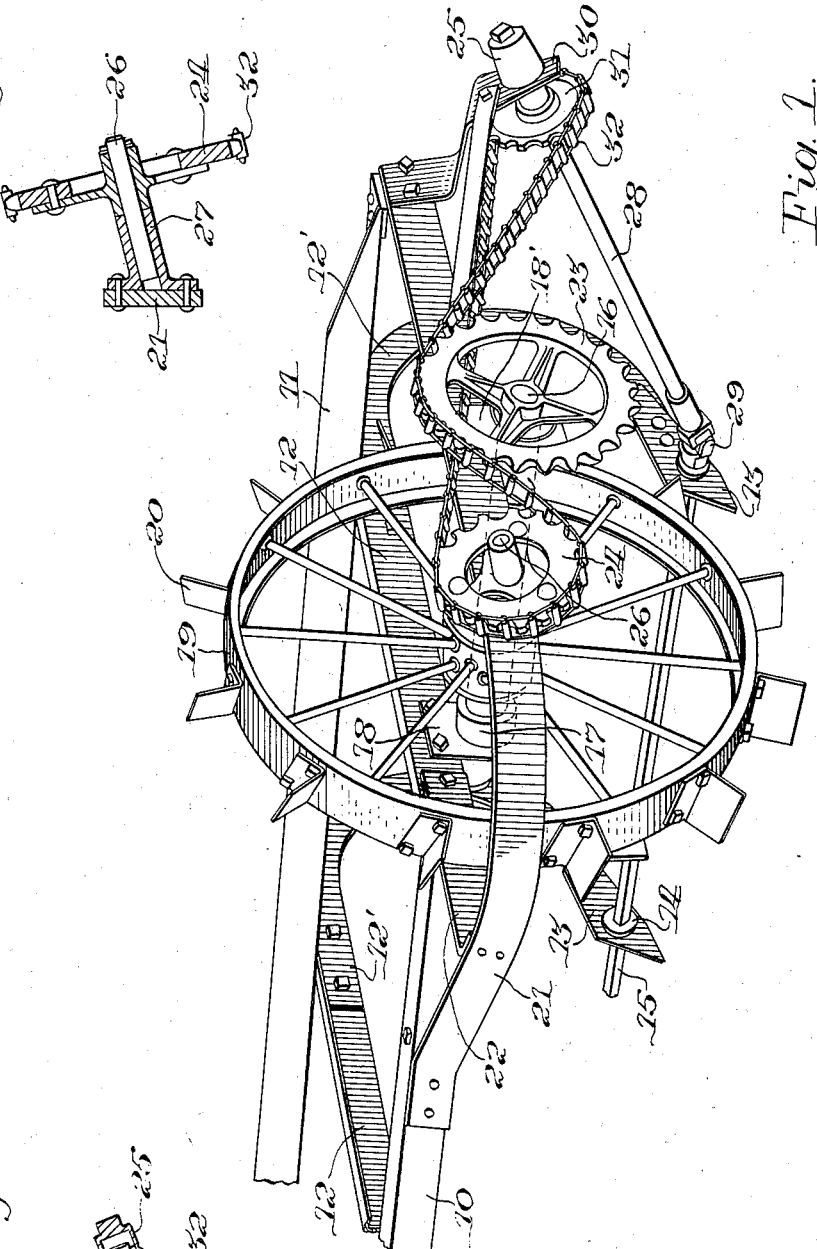
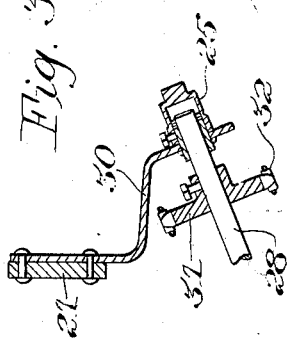
Inventor
Arnold E. W. Johnson
By V. F. Lassagne
Atty.

Patented Oct. 12, 1937

2,095,874

UNITED STATES PATENT OFFICE 2,095,874

ROD WEEDER DRIVE

Arnold E. W. Johnson, Chicago, Ill., assignor to International Harvester Company, a corporation of New Jersey Application December 24, 1936, Serial No. 117,435

5 Claims. (Cl. 97—42)

This invention relates to improvements in driving means for rotary rod weeders and the like.

In this type of implement, a rotary rod travels beneath the surface of the soil for removing weeds and other vegetation including their roots from the soil.

One of the principal problems involved in implements of this type is to provide a satisfactory mechanism for driving the rotary rod from a traction wheel or from the axle which carries the implement frame.

The principal object of the present invention is to provide an improved chain drive mechanism for the rotary rod of weeders of the type above referred to.

This object is accomplished by a construction as shown in the drawing in which:

Figure 1 is a perspective view of the end portion of a rod weeder;

Figure 2 is an enlarged sectional view showing the idler sprocket and its attaching bracket; and, Figure 3 is an enlarged sectional view of the rod driving sprocket.

The main frame of the implement includes a transversely extending, forwardly positioned angle bar 10 and a transversely positioned angle bar 11 spaced rearwardly from the bar 10. Longitudinal bars 12 connect the bars 10 and 11. Said bars form the main elements of the frame to which the beams or yokes 12' are attached. Said beams are curved rearwardly downwardly and back toward the front to provide means for mounting the bearing shoes 13. Said bearing shoes form journals for journal members 14 mounted on a rotary weeder rod 15. The rod 15 extends transversely of the implement and is adapted to be rotated below the surface of the soil. The shoes 13 are shaped to penetrate the soil and are constructed to operate satisfactorily under the soil.

A transverse shaft 16 extends along one end of the frame, being supported in bearing members 17 mounted on a bracket 18 secured to the end cross bar 12. A wheel 19 is rotatably mounted on the shaft 16 as an axle. Said wheel is provided with traction lugs 20, as it serves both to support the frame structure and to furnish power for driving the rotary rod.

A supporting and bracing member 21 is shown attached to the forward frame member 10 and extending around the wheel to provide a support for an outboard bearing bracket 18 for the shaft 16. A brace 22, connected to the end cross bar 12, is also illustrated to furnish further support for the member 21.

A driving sprocket 23 is non-rotatably mounted on the outer end of the shaft 16 beyond the member 21. An idler sprocket 24 is rotatably mounted on a stub shaft 26 mounted on a bracket 27 secured to the member 21. Said shaft is positioned at an angle with the outer end extending upwardly to locate the sprocket 24 on an axis suitable to provide for driving the chain, as will be hereinafter described.

A driving shaft 28 is connected by a universal joint 29 with one end of the weeder rod 15. Said shaft extends upwardly and through a bearing bracket 30 secured to the rear outer end of the member 21. Said bracket is provided with a journal 25 at the proper angle for the shaft 28. A driven sprocket 31 is mounted on the shaft 28 near the upper end on the lower side of the bracket 30.

A sprocket chain 32 extends over the top of the driving sprocket 23 underneath and upwardly around the rear of the driven sprocket 31 directly from the top of said sprocket to the top of the idler sprocket 24 around the forward side of said sprocket and from the bottom thereof back to the top of the driving sprocket 23.

It will be noted that the sprockets 31 and 24 are substantially parallel. The angular position of the sprocket 31 is determined by the angularity of the shaft 28. The sprocket 24 is located to receive the chain direct from the sprocket 31. The sprocket 23 lies in a vertical plane, as it is mounted directly on the shaft 16. The transverse position of said sprocket is such as to clear the chain connecting the sprockets 31 and 24. There is, therefore, some twist in the chain between the bottom of the sprockets 24 and 31 and the top of the sprocket 23. The angularity of the two sprockets, however, is such that the chain is brought over into substantially the plane of the sprocket 23. There is, therefore, very little lateral carry-over, the strain on the chain being only due to the shifting in angularity of the sprockets. A chain of this type is sufficiently flexible to take care of relative angular differentiation of amounts necessary in a drive of this type.

In the operation of the weeder as disclosed, the frame structure is moved forwardly by animal or by tractor power. The wheels 19 are driven, thereby rotating the shaft 16 to furnish power for the weeder rod. With the sprocket 23 rotating in an anti-clockwise direction, the sprockets 24 and 31 are also driven in an anti-clockwise direction. This mechanism takes care of what would mean a reversal in drive if direct connections were utilized. The weeder rod is thereby given a rotation with the top edge moving forwardly, which is the effective direction of rotation for weeder devices of this type.

It is to be understood that applicant has disclosed and described only a preferred embodiment of his improved drive mechanism for rod weeders and that he claims as his invention all modifications falling within the scope of the appended claims.

What is claimed is:

1. In a rod weeder having a frame structure and a weeder rod rotatably supported on the frame structure for operation beneath the surface of the soil, and in combination therewith, a driving chain sprocket mounted on the frame structure, a drive shaft connected to the weeder shaft by a flexible connection and extending upwardly at an angle therefrom, means connected to the frame structure for rotatably supporting said shaft, a chain sprocket secured to said shaft, an idler chain sprocket mounted on the frame structure forwardly of the driving sprocket, and a chain directly connecting the upper portions of the chain sprocket on the angled shaft and the chain sprocket on the frame structure and passing beneath each of said sprockets and over the upper portion of the chain sprocket on the driving shaft.

2. In a rod weeder having a frame structure and a weeder rod rotatably supported on the frame structure for operation beneath the surface of the soil, and in combination therewith, a driving chain sprocket mounted on the frame structure, a drive shaft connected to the weeder shaft by a flexible connection and extending upwardly at an angle therefrom, means connected to the frame structure for rotatably supporting said shaft, a chain sprocket secured to said shaft, an idler chain sprocket rotatably mounted on the frame structure forwardly of the driving sprocket on an axis substantially parallel to the drive shaft, and a chain directly connecting the upper portions of the chain sprocket on the angled shaft and the chain sprocket on the frame structure and passing beneath each of said sprockets and over the upper portion of the chain sprocket on the driving shaft.

3. In a rod weeder having a frame structure, a supporting and driving wheel, a transverse shaft rotatably mounted on the frame structure to which said wheel is secured, and a weeder rod rotatably supported for operation on the frame structure for operation beneath the surface of the soil, and in combination therewith, a driving chain sprocket mounted on the transverse shaft, a drive shaft connected to the weeder shaft by a flexible connection and extending upwardly at an angle therefrom, means connected to the frame structure for rotatably supporting the upper end of said shaft, a chain sprocket secured to said shaft, an idler chain sprocket mounted on the frame structure forwardly of the transverse shaft, and a chain directly connecting the upper portions of the chain sprocket on the angled shaft and the chain sprocket on the frame structure and passing beneath each of said sprockets and over the upper portion of the chain sprocket on the driving shaft.

4. In a rod weeder having a frame structure, a supporting and driving wheel, a transverse shaft rotatably mounted on the frame structure to which said wheel is secured, and a weeder rod rotatably supported for operation on the frame structure for operation beneath the surface of the soil, and in combination therewith, a driving chain sprocket mounted on the transverse shaft, a drive shaft operatively connected to the weeder shaft and extending upwardly at an angle therefrom, means connected to the frame structure for rotatably supporting the upper end of said shaft, a chain sprocket secured to said shaft, an idler chain sprocket rotatably mounted on the frame structure forwardly of the transverse shaft, said idler sprocket lying in substantially the same plane as the sprocket on the angled drive shaft, and a chain directly connecting the upper portions of the chain sprocket on the angled shaft and the chain sprocket on the frame structure and passing beneath each of said sprockets and over the upper portion of the chain sprocket on the driving shaft, the lower portions of the angularly positioned sprockets lying with the teeth thereon substantially in alignment with the teeth on the driving sprocket.

5. In a rod weeder having a frame structure, a supporting and driving wheel, a transverse shaft rotatably mounted on the frame structure to which said wheel is secured, and a weeder rod rotatably supported for operation on the frame structure for operation beneath the surface of the soil, and in combination therewith, a driving chain sprocket mounted on the transverse shaft, a drive shaft operatively connected to the weeder shaft and extending upwardly at an angle therefrom, means connected to the frame structure for rotatably supporting the upper end of said shaft, a chain sprocket secured to said shaft, an idler chain sprocket rotatably mounted on the frame structure forwardly of the transverse shaft, said idler sprocket lying in substantially the same plane as the sprocket on the angled drive shaft and a chain directly connecting the upper portions of the chain sprocket on the angled shaft and the chain sprocket on the frame structure and passing beneath each of said sprockets and over the upper portion of the chain sprocket on the driving shaft.

ARNOLD E. W. JOHNSON.